Figure 1:
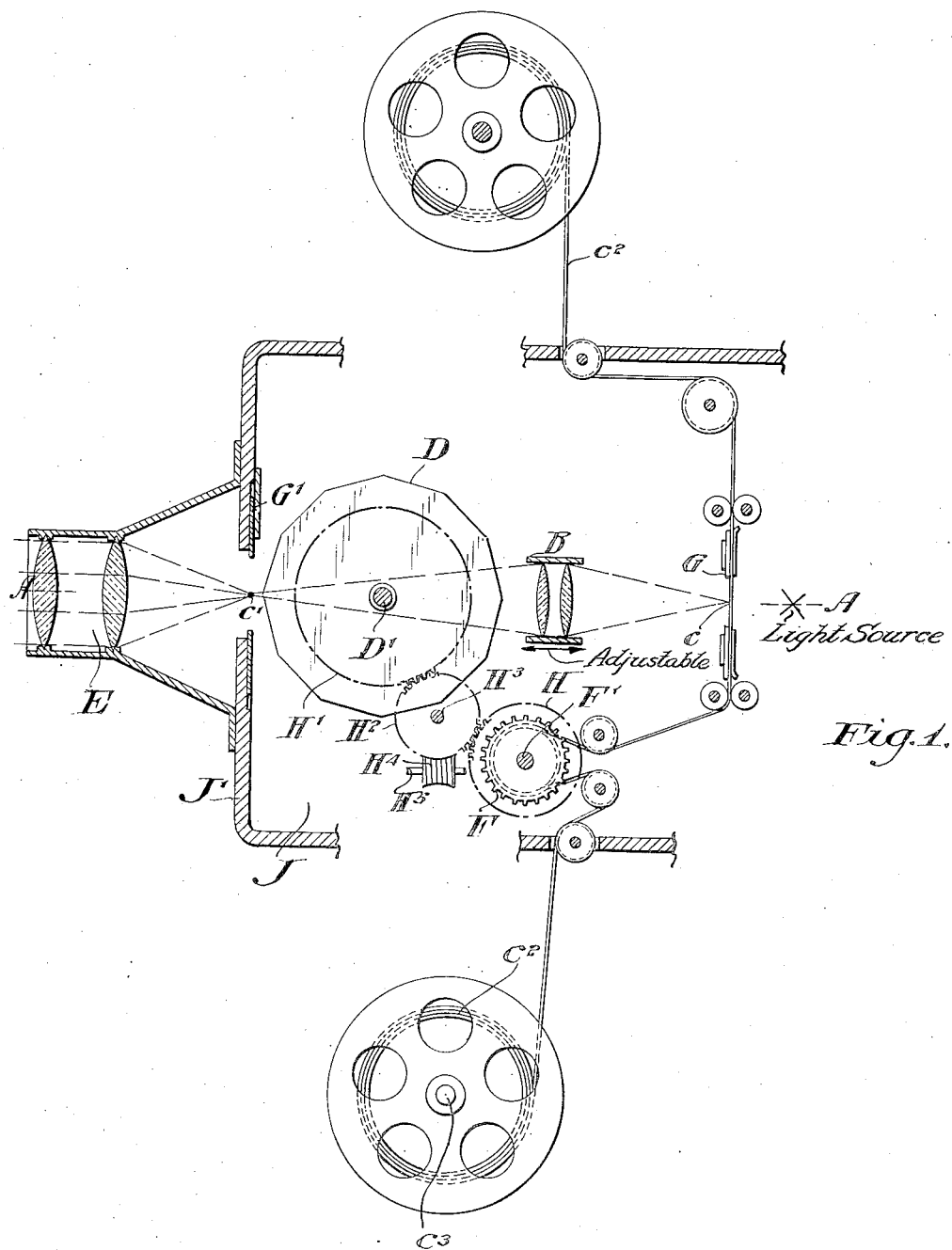

Oct. 3, 1933.  L. J. R. HOLST  1,928,623
METHOD OF AND APPARATUS FOR PRODUCING MOTION PICTURES
Filed April 21, 1930

Inventor:
Lodewyk J. R. Holst,
By
Attorney

Patented Oct. 3, 1933

1,928,623

UNITED STATES PATENT OFFICE 1,928,623

METHOD OF AND APPARATUS FOR PRODUCING MOTION PICTURES

Lodewyk J. R. Holst, Brookline, Pa.

Application April 21, 1930. Serial No. 445,882

6 Claims. (Cl. 88—16.8)

My invention is an improved method of and apparatus for projecting upon a screen from a series of moving images light rays which are angularly deflected in synchronism with and in proportion to the advance of the respective images by turning a prism block in the line of the light rays on its axis a number of rotations proportional to the number of images, the edges formed at the juncture of the angular adjacent faces of the block being maintained in constant relation to the lines of juncture between the images of the series.

My invention is primarily designed to obviate the visible dimming of related image sections resulting from the failure of light rays to penetrate into the prism block and their reflection back from prism surfaces when the angle of incidence of the image rays with steeply inclined prism surfaces is sufficiently large due to the passage of the division line between adjoining prism faces through the lower and upper portions of the image field and particularly the regions adjoining the upper and lower quarters thereof.

My invention further obviates the projection of objectionable additional partial images resulting from internal reflections against prism surfaces not at the time engaged in transmitting the primary projected image, such partial images being formed ordinarily at variable distances from the top and bottom lines of the projected main image. The beams of light forming the additional partial images ordinarily separate out from the light beam forming the primary image at a considerable distance from the projection lens, hence prevention of the projection on the screen of such additional partial images has hitherto been impracticable as the placing of suitable surfaces for intercepting such partial image rays would encroach upon space desired for an audience of spectators.

In accordance with the present invention, the light rays passing through an image on a movable film are reflected by an auxiliary lens before passage through the rotatable prism to produce an aerial image in a focal plane substantially coincident with the objective focal plane of a usual projecting lens. The auxiliary lens placed between the image film and rotatable prism is preferably of short focus and large relative aperture and is so adjusted that the aerial image produced approximates the size of the film image and is positioned in advance of the edge of the prism farthest from the film.

The auxiliary lens causes converging image rays or bundles, instead of diverging or parallel image rays or bundles, of light to traverse the prism and hence the angles of incidence of the light bundles are greatest when the prism presents its surfaces normal to the optical axis and gradually decrease until the line of separation between two prism surfaces is in the horizontal plane of the optical axis. A substantially constant image intensity on the screen is thereby secured and the visible presence of the prism division lines on the screen can be completely obliterated by guiding the image band along a vertically extended opening of sufficient length to permit simultaneously illumination of a length of film containing more than one image.

The amount of image transmitted to the screen may be regulated by means of adjustable horizontal limiting edges of a second gate or plate positioned in the front focal plane of the auxiliary lens at the far side of the prism so as to permit the passage of an aerial image of a single film image unit. By adjusting the aperture of this image gate so that it is just sufficient to pass the image of a single film image, the partial aerial image of a single film image, the partial images resulting from the internal reflections above referred to are intercepted by the inner surface of the image gate just above and below the aperture therein and are thus effectively prevented from reaching the screen.

Since the image to be projected upon the screen is the aerial image formed by the auxiliary lens and not the film image, in order to obviate motion in the image reproduced on the screen the prism block is rotated so that its surface nearest to the film moves in a direction opposite to the direction of movement of the film.

The beam projected through the film may be supplied from any suitable source of illumination and may be passed through suitable lenses before it strikes the image bearing film which may be either perforated or unperforated and advanced continuously in any suitable manner.

The characteristic features and advantages of my improvements will further appear from the following description and the accompanying drawing showing diagrammatically an illustrative apparatus embodying my invention and adapted for the practice of my method, the figure being a vertical sectional view through a skeletonized apparatus.

As illustrated in the drawing, a projector housing J having the usual projection lens E is provided with a film gate G containing an elongated aperture and an image gate G' containing an aperture which may be adjusted in size by the adjustment of the horizontal edges of the image gate.

A spindle D' journalled in the projector housing J has fixed thereon a twelve sided prism block of optical glass D disposed in the optical axis A—A of the projector between the gates G and G' and an auxiliary lens B is adjustably mounted in the optical axis A, A' between the gate G and prism D.

The spindle D' has fixed thereto a gear wheel H' which meshes with an idler gear H² rotatable by any suitable means such as a multiple worm gear H⁴ having a spindle H⁵ connected with a suitable motor or other source of power not shown. The idler H² also meshes with a gear H fixed to the shaft F' of a toothed drum F by which an image band C² is drawn through the projector and delivered to the take-up drum C³, the film in its passage through the projector passing over and between rollers and past the elongated aperture in the gate G in the usual manner.

The diameters of the gears H and H' are proportioned to the size of the propeller drum F and the number of surfaces of the prism block D. For instance, if the circumference of the drum F corresponds to the length of eight images on the image band C² and the prism block has twelve surfaces, the gear H' will be one and a half times as large as the gear H to insure the passage of one image unit of the film during the rotation of the prism block through one-twelfth of a revolution to secure the synchronous movement of the film images and prism and maintain the angles between the faces of the prism in constant relation to the joints between the images on the film.

In the practice of my invention, a light beam of suitable intensity and from a suitable source is projected along the optical axis of the projector. The auxiliary lens B is so proportioned and adjusted as to produce at its forward focal plane c' an aerial image approximately equal in size to an image on the film c² at the object point c. The front focal distance Bc' is longer than the back focal distance Bc due to the effect of the prism block D in accord with the well known expression $$\frac{n-1}{n} \times t,$$

in which $n$ represents the refractive index of the glass and $t$ the distance between any pair of parallel surfaces.

The prism is computed to displace each view through its own height, but slight variations in the refractive indicia of individual prisms of the same dimensions produce small differences in their individual refractive values. Hence the exact size of the reproduced image would be dependent on the amount of deflection of the image rays caused by the rotation of the prism block but this is compensated for in each projector by a corresponding slight difference in the adjustment of the auxiliary lens B, which, when once adjusted in correct harmony with the prism action may be permanently fastened in position.

The first focal plane of the longitudinally adjustable projection lens E coincides with the second focal plane c' of the auxiliary lens B containing the aerial image which is thrown by the projection lens on the screen with perfect evenness of illumination in any position of the prism block, be it in motion or at rest.

By the adjustment of the horizontal edges of the gate G' the amount of image transmitted to the screen may be regulated and the objectionable partial images caused by internal prism reflections intercepted.

By my improvements, I am enabled to produce motion pictures by projecting on a screen an aerial image formed from a moving image strip by light rays passing through a lens and obviating the movement resulting from the translation of the image strip by displacing the light rays in the image space of the lens in synchronism with and in proportion to the movement of the image strip, the posterior focal plane of the lens forming the aerial image being coincident with the anterior focal plane of the projecting lens. In the drawing, the rays from the auxiliary lens B to the point c' indicate the size of the converging bundle which illuminates the point c', whereas the lines indicating diverging rays from the point c' to the projecting lens E indicate the bundle absorbed by the latter lens.

Having described my invention I claim:

1. In the method of producing motion pictures, the steps which consist in forming an aerial image by rays passing through a film image converging lens and rotatable prism having parallel surfaces and adjusting the size of the aerial image to substantially the size of the film image by positioning the lens relative to the prism block proportionately to the amount of deflection of the image rays caused by the rotation of the prism block.

2. A motion picture projector comprising a projecting lens, means forming an image gate substantially coincident with the anterior focal plane of the projecting lens, a prism having at least six pairs of parallel faces rotatable across the optical axis of said lens adjacent to said image gate, a light converging lens on the opposite side of said prism from said image gate, said light converging lens having its posterior focal plane in substantially the plane of said image gate, said lens having a curvature converging light passing through to said prism so that the angle of incidence of the light beams are greatest when the prism presents its surfaces normal to the optical axis and gradually decrease until the line of separation between two prism surfaces is in the horizontal plane of the optical axis, means for moving an image strip across the optical axis, of said light converging lens, and a light source projecting a beam of light through said image strip, and an image strip gate through which light from said source is simultaneously projected upon a plurality of image units of said strip.

3. In an optical rectifier, the combination of means for moving an image strip, a light source illuminating one or more picture units of an image strip moved by said means, a positive lens having an object focal plane substantially coincident with said image strip moved by said means and a conjugate focal plane in which rays converged by said lens form image points from object points on said image strip moved by said means, plano-parallel light refracting means disposed in the image space of said lens and having at least two parallel surfaces, and means for rotating said parallel surfaces about an axis crossing normally the optical axis of said lens, and normal to the direction in which succeeding images follow one another, said surfaces moving in harmony with the movement of said image strip to produce a stationary image, the angle of incidence of light rays converged by said lens on the surface of said refracting means nearest to said lens being greatest when such surface is normal to the optical axis of the lens and gradually decreasing until the edge of such surface is in the plane of said optical axis.

4. In an optical rectifier, the combination of means for moving an image strip, a light source illuminating one or more picture units of an image strip moved by said means, a positive lens having an object focal plane substantially coincident with an image strip moved by said means and a conjugate focal plane in which rays converged by said lens form image points from object points on an image strip moved by said means, a plano-parallel refracting member disposed in the image space of said lens and having a plurality of pairs of equal parallel surfaces arranged to form a regular polygonal transparent block, and means for rotating said block about an axis normally crossing the optical axis of said lens and normal to the direction of movement of said image strip across said optical axis and in harmony with the movement of said image strip to produce a stationary image, the angle of incidence of light rays converged by said lens on the surface of said block nearest to said lens being greatest when such surface is normal to the optical axis of the lens and gradually decreasing as the line of division between two adjacent surfaces of the block approach the plane of said optical axis.

5. In an optical rectifier, the combination of means for moving an image strip, a light source illuminating one or more picture units of an image strip moved by said means, a positive lens having an object focal plane substantially coincident with said image strip moved by said means and a conjugate focal plane in which rays converged by said lens form image points from object points on said image strip moved by said means, a rotatable plano-parallel light refracting means comprising a plate disposed in the image space of said lens and having at least two parallel surfaces, said lens being so curved and positioned as to form an image equal in heighth to the displacement resulting from the rotation of the parallel surfaces of said plate, and means for rotating the parallel surfaces of said plate about an axis normally crossing the optical axis of said lens and in harmony with the movement of said film to produce a stationary image, the angle of incidence of light rays converged by said lens on the surface of said block nearest to said lens being greatest when such surface is normal to the optical axis of the lens and gradually decreasing as such surface moves from such normal position.

6. In the method of producing motion pictures, the steps which consist in forming an image by rays passing through a film image, converging lens and rotatable plano-parallel light refracting means having at least two parallel surfaces, and adjusting the size of said first named image to the displacement power of the rotatable light refracting means by positioning the lens along its optical axis and relative to said film image in functional relation to the amount of deflection of image rays caused by the rotation of the light refracting means.

LODEWYK J. R. HOLST.